United States Patent
Freidl et al.

(10) Patent No.: US 10,400,673 B2
(45) Date of Patent: Sep. 3, 2019

(54) FEEDFORWARD SYSTEMS AND METHODS FOR SPRAY INTERCOOLING FLUID FLOWS

(71) Applicant: General Electric Company, Schenectady, NY (US)

(72) Inventors: Roman Freidl, Houston, TX (US); Eugene Damankah, Salem, VA (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 15/187,304

(22) Filed: Jun. 20, 2016

(65) Prior Publication Data

US 2017/0363005 A1    Dec. 21, 2017

(51) Int. Cl.
*F02C 3/30* (2006.01)
*F02C 7/143* (2006.01)
*F02C 3/04* (2006.01)

(52) U.S. Cl.
CPC .............. *F02C 7/1435* (2013.01); *F02C 3/04* (2013.01); *F02C 3/305* (2013.01); *F05B 2270/1062* (2013.01)

(58) Field of Classification Search
CPC ... F02C 7/1435; F02C 3/30; F05B 2270/1062
See application file for complete search history.

(56) References Cited

U.S. PATENT DOCUMENTS

| | | | |
|---|---|---|---|
| 4,217,754 A * | 8/1980 | Schmidt-Roedenbeck | F02C 9/28 60/39.281 |
| 4,622,808 A * | 11/1986 | Kenison | G01P 5/00 415/27 |
| 4,928,478 A | 5/1990 | Maslak | |
| 5,189,620 A * | 2/1993 | Parsons | G05B 7/02 318/609 |
| 5,228,283 A | 7/1993 | Sciocchetti | |
| 6,260,350 B1 * | 7/2001 | Horii | F02C 7/1435 60/39.3 |
| 6,516,603 B1 | 2/2003 | Urbach et al. | |
| 8,567,177 B1 * | 10/2013 | Drori | F01D 25/32 60/39.3 |
| 8,694,172 B2 | 4/2014 | Kumula et al. | |
| 2003/0217553 A1 * | 11/2003 | Gadde | F02C 3/30 60/775 |
| 2005/0034463 A1 * | 2/2005 | Simpson | F02C 3/30 60/775 |
| 2005/0172635 A1 * | 8/2005 | Carlson, Jr. | F01K 21/047 60/775 |
| 2006/0047347 A1 * | 3/2006 | Boyden | G05B 13/048 700/19 |

(Continued)

*Primary Examiner* — William H Rodriguez
(74) *Attorney, Agent, or Firm* — Fletcher Yoder, P.C.

(57) ABSTRACT

A system for a gas turbine includes a control system comprising a processor. The processor is configured to receive a signal indicating spray intercooling fluid demand of the gas turbine. The processor is configured to determine a rate of change of the spray intercooling fluid demand. The processor is configured to control flow of a nitrogen oxide ($NO_X$) minimization fluid that reduces $NO_X$ emissions from the gas turbine based at least in part on the rate of change of the spray intercooling fluid demand.

17 Claims, 4 Drawing Sheets

(56) References Cited

U.S. PATENT DOCUMENTS

| | | | |
|---|---|---|---|
| 2007/0059159 A1* | 3/2007 | Hjerpe | B08B 3/02 415/117 |
| 2007/0214766 A1* | 9/2007 | Obana | F01K 9/04 60/39.15 |
| 2007/0264014 A1* | 11/2007 | McClean | H04B 10/2931 398/37 |
| 2009/0287392 A1* | 11/2009 | Thomas | F02D 41/0027 701/103 |
| 2013/0015663 A1 | 1/2013 | Kumula et al. | |
| 2013/0131879 A1* | 5/2013 | Andresen | H02J 3/386 700/287 |
| 2014/0137564 A1* | 5/2014 | Scipio | F02C 3/30 60/775 |
| 2015/0337704 A1* | 11/2015 | Heiberger | F01N 3/0842 60/273 |
| 2017/0363006 A1* | 12/2017 | Freidl | F02C 7/16 |

* cited by examiner

FEEDFORWARD SYSTEMS AND METHODS FOR SPRAY INTERCOOLING FLUID FLOWS

BACKGROUND

The subject matter disclosed herein relates to gas turbines, and more particularly, to controlling emissions generated by gas turbines via certain fluid flows.

Frequently in power generation, turbine systems may be used to convert an oxidant and fuel into energy. For example, a gas turbine may be used to provide rotational energy to power a vehicle, industrial equipment, or a generator to generate electricity to power a grid. Gas turbines may use one or more compressors to provide a compressed oxidant (e.g., air, oxygen, oxygen-enriched air, or oxygen-reduced air) that is combined with a fuel. The oxidant and fuel may then be combusted to rotate blades of the turbine to produce the rotational energy.

As the blades of the turbine rotate, various types of exhaust emissions, such as $NO_X$ emissions, may exit the system due to the combustion of the oxidant and fuel. However, during increases and decreases in power, the combustion of the fuel and air may cause an increase in $NO_X$ emissions. These increases in $NO_X$ emissions can cause the gas turbine to exceed emissions compliance. As such, it is desirable to control aspects of the turbine to reduce emissions and to keep the gas turbine in compliance with regulations.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system for a gas turbine includes a control system that includes a processor configured to receive a signal indicating spray intercooling fluid demand of the gas turbine, determine a rate of change of the spray intercooling fluid demand, and control flow of a nitrogen oxide ($NO_X$) minimization fluid that reduces $NO_X$ emissions from the gas turbine based at least in part on the rate of change of the spray intercooling fluid demand.

In a second embodiment, a system includes a gas turbine configured to generate power from a fuel to drive a load, an at least one compressor configured to compress an oxidant, a spray intercooling system configured to spray a spray intercooling fluid to cool the oxidant in the at least one compressor, and a controller configured to receive a signal indicating demand of the spray intercooling fluid, determine a rate of change of the demand of the spray intercooling fluid, and control flow of a nitrogen oxide ($NO_X$) minimization fluid that reduces $NO_X$ emissions from the gas turbine based at least in part on the rate of change of the demand of the spray intercooling fluid to account for changes in $NO_X$ emissions due to changes in power of the gas turbine.

In a third embodiment, a method for controlling a gas turbine includes receiving, via a processor, a signal indicating demand of a spray intercooling fluid that cools an oxidant in a compressor of the gas turbine, determining, via the processor, a rate of change of the demand of spray intercooling fluid demand, and controlling, via the processor, flow of a nitrogen oxide ($NO_X$) minimization fluid that reduces $NO_X$ emissions from the gas turbine based at least in part on the rate of change of the demand of spray intercooling fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
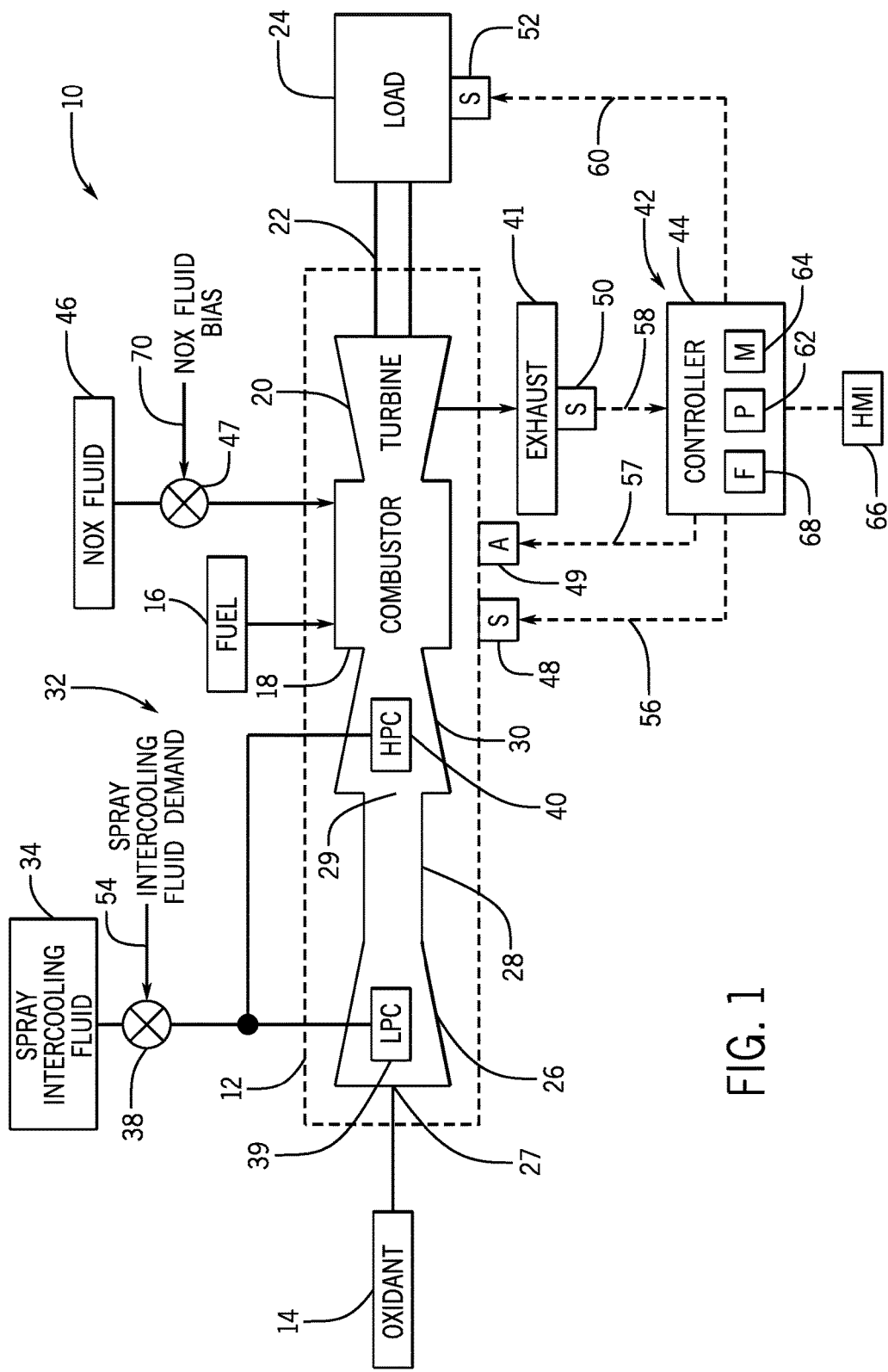
FIG. 1 is a schematic diagram of an embodiment of a control system for a gas turbine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed towards a system and method to maintain a gas turbine within emissions compliance. The gas turbine may include one or more compressors, a combustor, and one or more turbines. For example, the gas turbine may receive an oxidant to be compressed in a low pressure compressor and a high pressure compressor. Then, the gas turbine may combust fuel and the oxidant in the combustor. For instance, the combustion process may be used to rotate turbine blades that rotate a shaft and drive a load, such as an electrical generator to generate electricity for a power grid. Further, the gas turbine system may include a spray intercooling system that sprays a spray intercooling fluid, such as water, into the compressor to reduce a temperature of the oxidant, thereby augmenting power generated by the gas turbine.

After the fuel and oxidant undergo the combustion process, the combusted mixture may produce an exhaust, which may include one or more pollutants. The amount of pollutants produced may depend on characteristics of the fuel and/or oxidant, and certain operating parameters for the gas turbine, such as fuel flow, temperature, pressure, and/or certain ratios (e.g., oxidant-to-fuel ratio, compression ratio).

To reduce emissions of pollutants, a fluid, such as water, may be mixed with the fuel before entering the combustor or within the combustor to reduce a temperature of the combustion process, thereby reducing $NO_X$ pollutants generated from the process. That is, by controlling the fluid entering the combustor, the gas turbine may remain within compliance of national, state, and local emissions thresholds. In some embodiments, a valve may be included between the fluid source and the combustor to allow for control of the flow of the fluid into the combustor to minimize or prevent fluid waste and to control emissions.

A control system may be used to control various operations of the turbine system, such as the valve of the fluid source, to account for the pollutants produced in the combustion process. For example, the control system may control operation of the valve to control the fluid injected into the combustor based on the emissions in the exhaust to allow the control system to remain in emissions compliance. However, a delay due to the nitrogen oxide ($NO_X$) emission feedback instruments occurs in controlling fluid injected into the combustor before the injected fluid reflects the changes in the exhaust. To account for this delay, the control system may utilize a feed forward control of the spray intercooling fluid demand for the fluid demand of the gas turbine. That is, there is a small cross-over effect of spray intercooling injection to emission mitigation. To maintain emissions compliance, the controller may take into account a change in the spray intercooling flow.

The control system may include a processor that accesses a signal indicating demand of a spray intercooling fluid from a spray intercooling system that controls temperature of the oxidant through compressors. The processor may then determine a rate of change of the spray intercooling fluid demand. The processor may control flow of the fluid based on the rate of change of spray intercooling fluid demand to control emissions during changes in power of the gas turbine.

Turning to the figures, FIG. 1 is a schematic diagram of an embodiment of a power generation system 10 that includes a gas turbine system 12. The gas turbine system 12 may receive an oxidant 14 (e.g., air, oxygen, oxygen-enriched air, or oxygen-reduced air) and a fuel 16 (e.g., gaseous or liquid fuel), such as natural gas, syngas, or petroleum distillates. In certain embodiments, the oxidant 14 may include exhaust gas recirculation (EGR) gas. The oxidant 14 may be pressurized and combined with the fuel 16 to be combusted in a combustor 18. The combusted oxidant may then be used to apply forces to blades of a turbine 20 to rotate a shaft 22 to provide power to a load 24.

The gas turbine system 12 may include one or more compressors that increase the pressure of the oxidant 14. As depicted in FIG. 1, the gas turbine system 12 includes a low pressure compressor 26 and a conduit 28 that couples a discharge of the low pressure compressor 26 to an inlet 29 of a high pressure compressor 30. The oxidant 14 enters through an inlet 27 of the low pressure compressor 26 and is compressed. The oxidant 14 may flow through the conduit 28 to the inlet 29 of the high pressure compressor 30 where the oxidant 14 is further compressed. While two compressors are shown in FIG. 1, this is simply used as an example. Any suitable number of compressors (e.g., 1, 2, 3, or more) may be used to compress the oxidant.

The oxidant 14 is then compressed in the high pressure compressor 30 and combined with the fuel 16 into an oxidant-fuel mixture to be combusted in the combustor 18. As the oxidant-fuel mixture is combusted (e.g., burned and/or ignited), the oxidant-fuel mixture expands through one or more turbines 20. The turbine 20 may be coupled to a shaft 22 that is coupled to one or more loads 24. The turbine 20 may include one or more turbine blades that rotate causing the shaft 22 to provide rotational energy to the load 24. For example, the load 24 may include an electrical generator or a mechanical device in an industrial facility or power plant. The rotational energy of the shaft 22 may be used by the load 24 to generate electrical power. As the gas turbine system 12 generates power, the combusted oxidant-fuel mixture is expelled as an exhaust 41. The exhaust 41 may include one or more emissions, such as nitrogen oxides ($NO_X$), hydrocarbons (HC), carbon monoxide (CO) and/or other pollutants. The exhaust 41 may be treated in a variety of ways, such as with a catalyst system.

To reduce the one or more emissions in the exhaust 41, such as the $NO_X$ emissions, a $NO_X$ minimization fluid 46, such as water, may be sent to the combustor 18. Hereinafter, the $NO_X$ minimization fluid 46 may be referred to as "$NO_X$ fluid." For example, water may be mixed with the fuel 16 before entering the combustor 18 or mixed within the combustor 18. In some embodiments, a valve 47 may be included between a $NO_X$ fluid 46 source and the combustor 18 to control the flow of the $NO_X$ fluid 46 into the combustor 18. As the fuel 16 is combusted, the $NO_X$ fluid 46 can reduce the temperature of the combustion, thereby reducing the formation of $NO_X$ in the exhaust 41. Depending on the emissions and fluid 46 usage, it may be beneficial to run more fluid 46 or less fluid 46 by controlling the valve 47.

The power generation system 10 may include a spray intercooling system 32. The spray intercooling system 32 may reduce the temperature of the oxidant 14 in the one or more of the compressors 26 and 30 by providing (e.g., spraying) a spray intercooling fluid 34, such as water, into the air flow. That is, the spray intercooling system 32 may be configured to inject water into the one or more of the compressors 26 and 30 to increase a compression ratio, thereby increasing the power output. The spray intercooling process may also be referred to as wet-compression. As an example, the spray intercooling system 32 may include one or more spray nozzles 39 and 40 to spray a mist of the spray intercooling fluid 34 mixed with air to transfer heat from the oxidant 14 to the mist. Further, the spray nozzles 39 and 40 may be mounted to a front frame, an inlet, or any suitable location on the compressors 26 and 30. In some embodiments, the spray intercooling system 32 may use air (e.g., the oxidant 14) extracted from the high pressure compressor 30 to atomize the spray intercooling fluid 34 into a mist.

The supply system of the spray intercooling fluid 34 may include a variety of components for flow control, flow distribution, and fluid treatment. The fluid supply system may include a storage tank, a conduit, a freshwater source (e.g., a lake or river), a plant component (e.g., equipment in a power plant that provides a process fluid), a pump, a valve, a distribution manifold, a fluid treatment system (e.g., filter, solid-liquid separator, gas-liquid separator, and/or chemical absorber), or the like.

A flow of the spray intercooling fluid 34 from a supply to the nozzles 39 and 40 may be controlled based on a spray intercooling fluid demand signal 54. For example, the spray intercooling fluid demand signal 54 may be a signal sent to a valve 38, a solenoid, pump, or the like. To control the flow of the spray intercooling fluid 34 from the supply to the nozzle 39 and 40, the valve 38 may be opened or closed based on the spray intercooling fluid demand signal 54.

The power generation system 10 may include a control system 42 to monitor and/or control various aspects of the gas turbine system 12, the load 24, and/or the spray intercooling system 32. The control system 42 may include a controller 44 having inputs and/or outputs to receive signals from one or more sensors 48, 50, 52 and/or transmit signals to one or more actuators 49, such as the valve 38, to control the gas turbine system 12 and/or the spray intercooling system 32. The controller 44 may include a processor 62 or multiple processors, memory 64, and inputs and/or outputs to send and/or receive the signals 56, 57, 58, 60. The processor 62 may be operatively coupled to the memory 64 to execute instructions for carrying out the presently disclosed techniques. These instructions may be encoded in programs or code stored in a tangible non-transitory computer-readable medium, such as the memory 64 and/or other storage. The processor 62 may be a general purpose processor, system-on-chip (SoC) device, application-specific integrated circuit, or some other processor configuration.

Memory 64 may include a computer readable medium, such as, without limitation, a hard disk drive, a solid state drive, a diskette, a flash drive, a compact disc (CD), a digital video disc (DVD), random access memory (RAM), and/or any suitable storage device that enables processor 62 to store, retrieve, and/or execute instructions and/or data.

The processor 62 may send and/or receive signals to and/or from sensors and/or actuators of the gas turbine system 12 related to various operating parameters of the compressors 26, 30, the combustor 18, the turbine 20, the shaft 22, and/or the load 24. For example, the controller 44 may receive the signal 56 from the sensor 48 on the compressors 26 and 30 related to inlet and/or outlet temperatures and/or flow of the oxidant 14. As a further example, the processor 62 may sending signals to control speed settings or the air-fuel ratio. As an additional example, the processor 62 may receive the signal 60 related to power demand. Additionally and/or alternatively, the controller 44 may send and/or receive one or more signals from an operator via a human machine interface (HMI) 66. Further, the controller 44 may include a first order lag filter 68, as discussed in detail with respect to FIG. 3 below, which filters the spray intercooling fluid demand signal 54 to determine a rate of change of the spray intercooling fluid demand. While some examples are illustrated in FIG. 1, these are merely examples and any suitable sensors and/or signals may be positioned on the gas turbine system 12, the load 24, and/or the spray intercooling system 32 to detect operational parameters to control the power generation system 10 with the controller 44.

Further, the processor 62 may control or modulate the valve 38 to regulate the flow of the spray intercooling fluid 34 to the nozzles 39 and 40 based on the spray intercooling fluid demand signal 54. For example, if temperatures of the oxidant 14 in the one or more compressors 26 and 30 increase (e.g., due to ambient conditions), then the spray intercooling fluid demand signal 54 may increase, and the processor 62 may send the spray intercooling fluid demand signal 54 to the valve 38 to open the valve 38 to a greater degree than before the temperatures increased for cooling the oxidant 14 in the one or more compressors 26 and 30.

The processor 62 may also receive a signal 58 from a sensor 50 indicating properties of the exhaust 41, such as quantities of $NO_X$ feedback emissions. For example, the signal 58 may indicate increases in $NO_X$ emissions when temperatures of the combustor 18 increase. Further, the processor 62 may send a $NO_X$ fluid bias signal 70 to the valve 47 to control the flow of $NO_X$ fluid 46 to the combustor 18, thereby controlling levels of emissions as well as levels of $NO_X$ fluid usage. In some embodiments, when there is a change in power demand, there may be a delay between changes to control of the valve 47 and when the changes impact exhaust levels of $NO_X$ emissions in the exhaust 41. That is, the $NO_X$ emission feedback system may have a delay from when exhaust emissions change to when the control of $NO_X$ fluid flows 46 change.

To account for this delay, the processor 62 may control the flow of the $NO_X$ fluid 46 by utilizing a feed forward control of the spray intercooling fluid demand signal 54. That is, a $NO_X$ fluid bias signal 70 indicating an amount of $NO_X$ fluid 46 to be provided, via control of the valve 47, to the combustor 18 may be based at least in part on the spray intercooling fluid demand signal 54. In this manner, the processor 62 may control the emissions of the exhaust 41 at a faster interval than with systems that do not include feed forwarding of the spray intercooling fluid demand signal 54. As such, the processor 62 may maintain the gas turbine system 12 in emissions compliance (e.g., regulatory emissions compliance) for a longer duration during changes in power generation.

Figure 2:
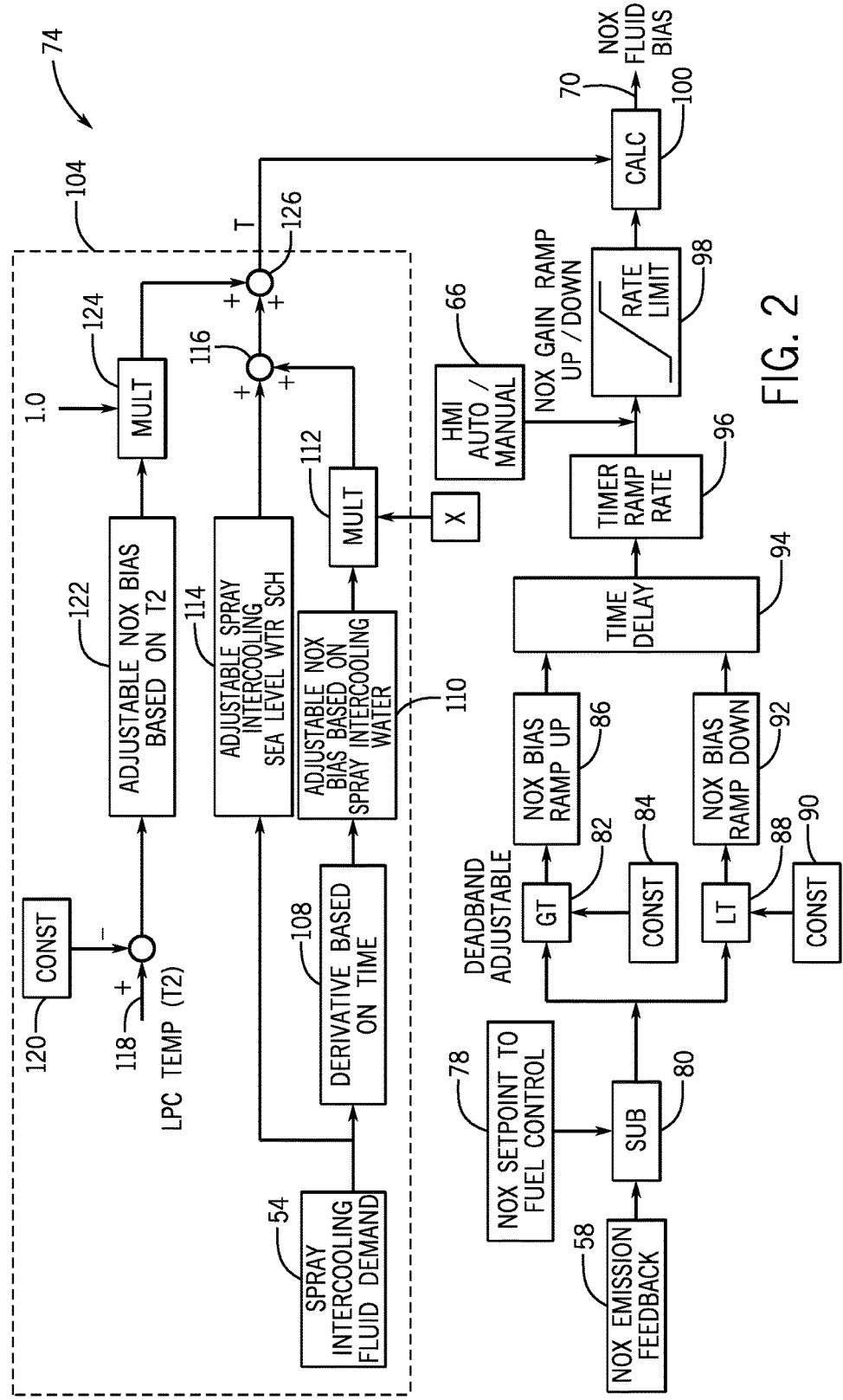
FIG. 2 is a block diagram of an embodiment of control actions performed by the control system of FIG. 1 to adjust for changes in power.

The controller 44 may be programmed or configured (e.g., via computer code or instructions executable by the processor 62 and stored in the memory 64) to control flow of the $NO_X$ fluid 46, via actuation or modulation signals directed to the valve 47, based on the spray intercooling fluid demand signal 54 and/or emissions in the exhaust 41. FIG. 2 is a block diagram of an example of a process 74 of operations performed by the controller 44 to control flow of the spray intercooling fluid 34 from the fluid supply of the spray intercooling system 32. These operations may be implemented in software (e.g., code executable by the processor 62 and stored in the memory 64), hardware, or any combination thereof. As explained above, the controller 44 may access signals from the sensor 50 indicating various aspects of the emissions, such as the $NO_X$ emission feedback signal 58. Further, the controller 44 may access or derive a $NO_X$ setpoint to fuel control 78 that indicates desired $NO_X$ output levels based on the fuel 16 (e.g., fuel type, fuel flow). That is, depending on various emission requirements, the gas turbine system 12 may control the fuel 16 (e.g., fuel flow) to control the emissions generated from the fuel 16 to remain within state and/or federal emission compliance. To better utilize resources (e.g., the fuel 16, oxidant 14, and/or spray intercooling fluid 34), it may be desirable to operate the system with the $NO_X$ emission feedback signal 58 indicating $NO_X$ emissions levels approximately at or near the desired emission levels of the $NO_X$ setpoint to fuel control 78. As will be appreciated, increasing $NO_X$ emission levels that are too low compared to emission standards may indicate that the system 12 is using more spray intercooling fluid 34 than if the system were operating at the $NO_X$ setpoint. The $NO_X$ emission feedback indicated in the signal 58 may be compared to the $NO_X$ setpoint to fuel control 78 to determine whether the current $NO_X$ emissions are greater than the desired levels or less than the desired levels. If the $NO_X$ emissions are greater than (block 82) a threshold 84 (e.g., 1, 0, −1, or another constant), then the controller 44 may perform a $NO_X$ bias ramp up 86 to increase flow of the $NO_X$ fluid 46 (e.g., via control of the valve 47). On the other hand, if the $NO_X$ emissions are less than (block 88) a threshold 90 (e.g., 1, 0, −1, or the same or another constant), then the processor 62 may perform a $NO_X$ bias ramp down 92 to decrease the flow of the $NO_X$ fluid 46 (e.g., via control of the valve 47).

To account for variance between the $NO_X$ emission feedback 58 and the $NO_X$ setpoint to fuel control 78, the processor 62 may delay (block 94) the ramp up or ramp down changes to the flow of the spray intercooling fluid 34 for a period of time. The delay 94 may be for a preset period of time (e.g., 1, 2, 3, 4, 2-3, or 1-4 minutes) or for a non-preset period dynamically calculated. The delay 94 may be associated with a period of time for the $NO_X$ emission feedback signal 58 of the gas turbine 12 to adjust based on the latest changes of power demand, fluid, emissions, and/or power output. For example, the delay 94 may be for an emission loop time period. That is, if a $NO_X$ bias ramp up 86 occurs and the gas turbine 12 increases flow of the $NO_X$ fluid 46 to reduce emissions, the effect of the increased flow of fluid 46 will not occur on the turbine 20 until the increased flow of $NO_X$ fluid 46 is used in the combustion process to rotate the turbine 20, and the sensor 50 on the exhaust 41 detects the $NO_X$ emissions for feedback. The combusting and exhaust venting may take time. As such, the processor 62 may account for the delay in receiving updated $NO_X$ emission feedback signals 58 by performing a time delay for a preset period of time. The time delay may be associated with the process cycle length. For example, if the turbine 12 takes 4 minutes to begin receiving signals 58 indicating $NO_X$ emission feedback based on changes in the flow of the fluid, the time delay 94 may account for the 4 minute wait time in receiving corrections to the feedback (e.g., adjustments due to a ramp up or ramp down). Further, the time delay 94 may be adjustable by an operator using the HMI 66. After the time delay 94 for the correction, the processor 62 may then ramp up or ramp down the signal for the flow of the fluid 46 over a period of time (block 96). The period of time may be adjustable via the HMI 66, thereby allowing an operator to adjust the ramp rate for ramp ups and/or ramp downs. These adjustments may be sent and/or received by the HMI 66 to allow an operator to better control the system 10. Additionally and/or alternatively the adjustments may be performed automatically via the processor 62 and preset values, such as preset time delays, or one or more of the processes may be performed manually using manual controls.

The processor 62 may then limit the rate 98 of the flow of the $NO_X$ fluid 46. The limited rate may then be used in a calculation 100 that accounts for other factors in determining the flow of the $NO_X$ fluid 46, such as ambient temperatures, ambient pressures, fuel usage, and any other suitable factors. Based on the limited rate 98 and one or more other parameters, the flow of the $NO_X$ fluid 46 may be controlled based on the $NO_X$ fluid bias 70 that controls opening and/or closing of the valve 47 to enable and/or ensure the turbine 12 to remain within emission compliance when the turbine 12 otherwise would exceed emission thresholds, such as during changes in power. Further, due to the time constants (e.g., 1-4 minute process) and variations between installations, the process 74 performed by the controller 44 allows the fluid injection response to coincide with the time delay of the feedback signals. While the processor 62 accounts for changes in power by using the above calculation, the aspects of the process 74 described above includes the time delay 94 between adjustments in the flow of the spray intercooling fluid 34. As such, controller 44 may be unable to provide adjustments to the $NO_X$ fluid 46 injection during changing power levels within times less than the time delay 94. For example, if the power levels are varying rapidly (e.g., in under one minute), the $NO_X$ emission feedback signal 58 may not reflect the varying power levels.

To adjust $NO_X$ fluid 46 injection controls during changes in power levels in a less time than the time delay 94, the calculation 100 used for generating the $NO_X$ fluid bias 70 that facilitates control of the flow of the fluid 46 may include a factor from a feed forward system 104. That is, the feed forward system 104 may adjust the flow of the $NO_X$ fluid 46 to account for changes in power levels that occur during time periods shorter than the delay in receiving the $NO_X$ emission feedback signal 58. The processor 62 may access the demand of spray intercooling fluid signal 54 (e.g., spray intercooling water demand). The demand signal 54 for spray intercooling fluid 34 may be associated with the power demand of the load 24. For example, increases in power demand of the load 24 may indicate increases in demand of spray intercooling fluid 34. Additionally and/or alternatively, other factors may affect fluid demand, such as changes in ambient temperatures, pressure, or the like.

The processor 62 may then determine a derivative based on time (block 108). The derivative may be a rate of change of how much the fluid demand of the signal 54 changes with respect to time. The processor 62 may then determine a $NO_X$ fluid bias 70 based on the derivative of the fluid demand. The $NO_X$ fluid bias 70 may correspond to an adjustment to the quantity of spray intercooling fluid 34 injected from the fluid supply. For example, the rate of change of spray intercooling fluid demand with respect to time may be converted to a factor used in determining injection of the $NO_X$ fluid 46, into the combustor 18 via the $NO_X$ fluid bias 70 that controls the valve 47. Further, the processor 62 may convert a positive rate of change into an increasing quantity of $NO_X$ fluid 46 to be injected. As another example, the processor 62 may utilize a look up table of rates of spray intercooling fluid changes associated with $NO_X$ fluid injection quantities or rates of $NO_X$ fluid injection quantities. The processor 62 may then multiply 112 the $NO_X$ fluid bias 110 value (e.g., 1, 2, or another constant).

The processor 62 may utilize an adjustable spray intercooling sea level water schedule 114 to compensate for elevation of the power generation system 10. For example, as altitude increases, the oxidant 14 pressure may decrease, thereby desiring less water to cool the oxidant 14. The processor 62 may determine an intermediate value 116 from the water schedule 114 and the $NO_X$ fluid bias 110 value (e.g., the multiplied 112 value).

The feed forward system 104 may also access a low pressure compressor temperature 118 of the oxidant 14 from the low pressure compressor 26 to account for temperatures of the oxidant 14 after the oxidant 14 is compressed. The low pressure compressor temperature 118 may be compared to a constant 120 and used to generate a $NO_X$ fluid bias 122 based on temperature that may be multiplied (e.g., by 1, 2 or another constant) and added to the intermediate value to determine a resultant value 126 (e.g., combined, added, etc.). As shown in FIG. 2, the resultant value 126 may then be included in the calculation 100 for generating the $NO_X$ bias fluid 102 signal.

Figure 3:
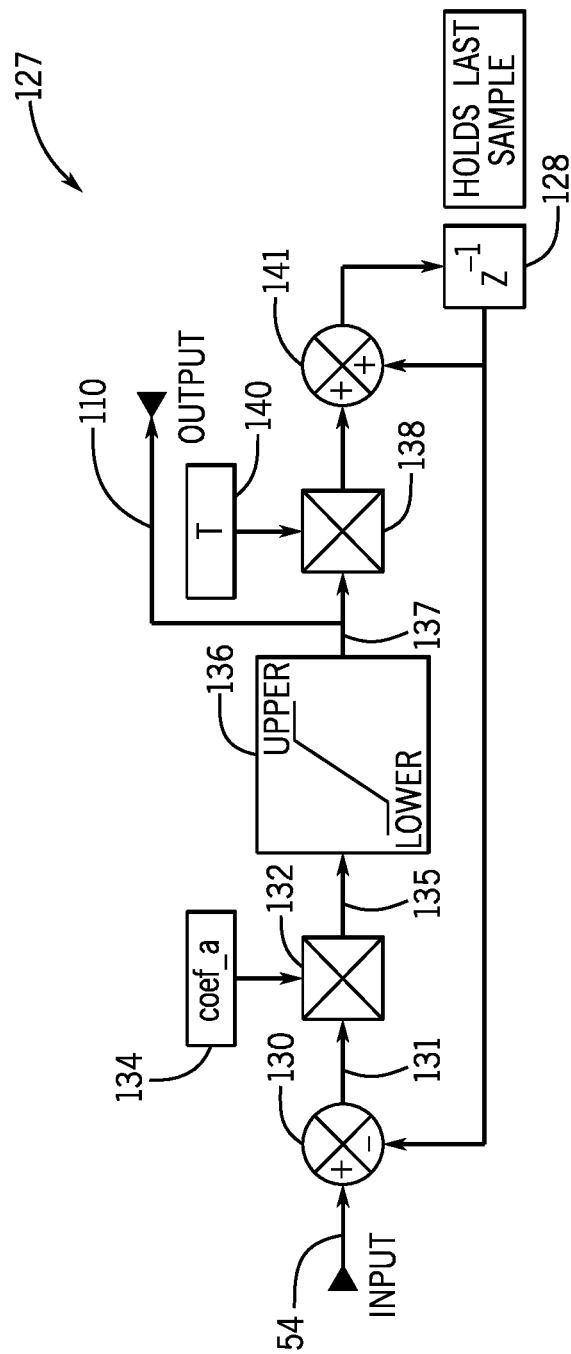
FIG. 3 is a block diagram of an embodiment of an action from FIG. 2 utilized to adjust for changes in power.

The processor 62 may perform a process 127 described with respect to FIG. 3 to determine the derivative based on time (block 108 of FIG. 2). The process 127 may be implemented as code or computer instructions executable via the processor 62 and stored in the memory 64. To determine the derivative based on time, the first order lag filter 68 may be applied to the spray intercooling fluid demand signal 54. Where K is a gain and τ is a time constant, transfer function for the first order lag filter 68 may be given as:

$$\frac{Y(s)}{X(s)} = \frac{Ks}{\tau S + 1}. \qquad \text{equation (1)}$$

The process 127 may include receiving the signal 54 indicating spray intercooling fluid demand, as explained above, and comparing (block 130) a sample value of the spray intercooling fluid demand signal 54 with one or more previous spray intercooling demand sample values 128 (e.g., a last sample). The result 131 may be multiplied (block 132) by a coefficient 134, denoted herein as coef$_a$. The coefficient 134 may be calculated as:

$$coef_a = \frac{1}{\tau} \qquad \text{equation (2)}$$

The time constant τ may be an adjustable time constant and/or may be a preset time constant (e.g., 100 ms). The multiplied result 135 may be limited using a limiter (block 136) that includes upper and/or lower threshold boundaries. The limited value 137 may then be output, as the adjustable NOX bias 110, to be multiplied (block 112) and/or included in the feed forward signal 104 for generating the NO$_X$ fluid bias 70 injection control. The value may then be multiplied 138 by a sampling time T 140 and then included 141 as the previous sample 128.

Figure 4:
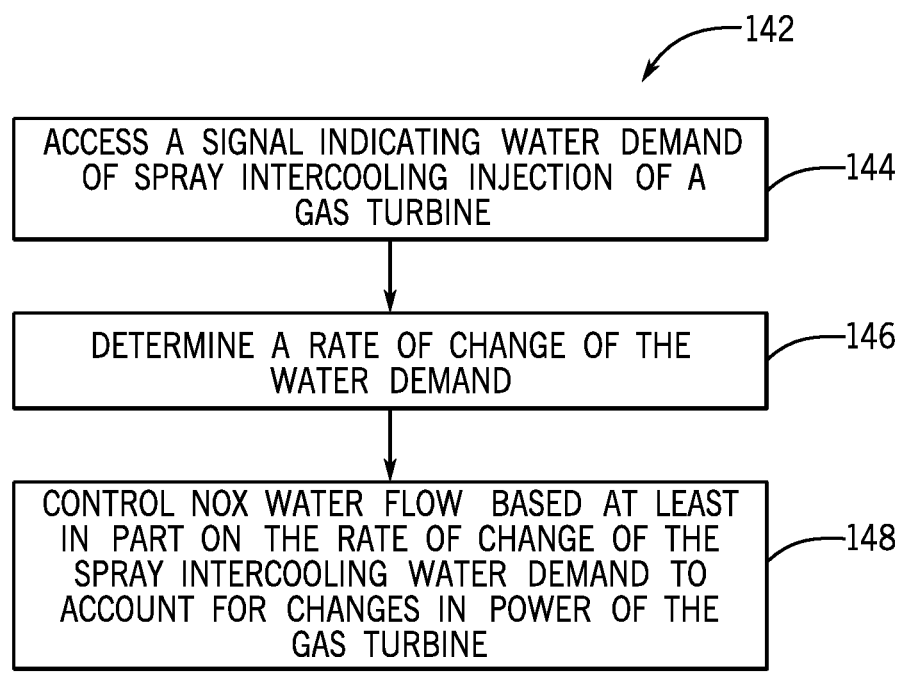
FIG. 4 is a flow chart of an embodiment of a process for implementing the control system of FIG. 1.

FIG. 4 is a flow chart of an embodiment of a process 142 that may be implemented as computer instructions or code stored in the memory 64 and executed by the processor 62 of the controller 44 of the power generation system 10 to enable the gas turbine 12 to control emissions at a rate faster than a time delay in changes to NO$_X$ emissions. The process 142 may be executed by the processor 62 to control injection and/or flow of the NO$_X$ fluid 46 to account for changes in power of the power generation system 10, such as changes during time periods shorter than the time period to receive NO$_X$ emission feedback signals 58 that reflect an adjustment in the NO$_X$ fluid bias 70.

The processor 62 may access a signal indicating spray intercooling fluid 34 demand (e.g., water demand) of the gas turbine 12 (block 144). The fluid 34 demand may be associated with the demand for power of the load 24 and/or the desired temperature of the oxidant 14 entering the one or more compressors 26 and 30. The processor 62 may continue by determining a rate of change of the spray intercooling fluid 34 demand (block 146). As described above with respect to FIG. 3, the rate of change may be determined via a first order lag filter 68.

The processor 62 may then control flow (block 148) of the NO$_X$ fluid 46 based at least in part on the rate of change of the spray intercooling water demand to account for changes in power of the gas turbine 10. For example, to control flow of the NO$_X$ fluid 46, the processor 62 may be configured to send a signal indicating the NO$_X$ fluid bias 70 to open or close a valve 47 between the NO$_X$ fluid supply and the combustor 18. For example, the processor 62 may control of the valve 47 in proportion to the rate of change. Further, the NOX fluid may be controlled based on other factors in addition to the rate of change of spray intercooling demand. For example, the calculation may be weighted based on an amount of time from the time delay such that NOX emission feedback is weighted more heavily after the time delay and changes in spray intercooling fluid demand are weighted more heavily before the time delay.

Technical effects of embodiments of the present disclosure are related to control of gas turbines. In an embodiment, a controller may send a signal to a valve to control flow of NO$_X$ water entering a combustor of the gas turbine to regulate emissions generated by the gas turbine. For example, the valve may be opened or closed based on signals sent by the controller. In some embodiments, the NO$_X$ water may be controlled by the controller based on demand of spray intercooling water that is sprayed into a compressor of the gas turbine.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for a gas turbine, comprising:
a control system comprising a processor configured to:
   receive a signal indicating spray intercooling fluid demand of the gas turbine;
   determine a rate of change of the spray intercooling fluid demand;
   control flow of a nitrogen oxide (NO$_X$) minimization fluid that reduces NO$_X$ emissions from the gas turbine based at least in part on the rate of change of the spray intercooling fluid demand;
   enable the gas turbine to remain in regulatory emissions compliance during a delay in time between a change in the NO$_X$ minimization fluid entering a combustor of the gas turbine and feedback from NO$_X$ emissions generated by the gas turbine; and
   receive feedback from emissions associated with changes in the flow of the NO$_X$ minimization fluid after a first period of time greater than a second period associated with controlling flow of NO$_X$ minimization fluid based on the rate of change of the demand of spray intercooling fluid.

2. The system of claim 1, wherein the processor is configured to determine the rate of change of the spray intercooling fluid demand by utilizing a first order lag filter.

3. The system of claim 2, wherein the first order lag filter comprises a transfer function of Y(s)/X(s)=Ks/(ts+1), wherein Y(s) is the output in the Laplace domain, and X(s) is the input in the Laplace domain, t is a time constant, and K is a gain.

4. The system of claim 1, wherein the processor is configured to determine the rate of change of the spray intercooling fluid demand based on a compared value derived by comparing a previous fluid demand sample with a current fluid demand sample.

5. The system of claim 4, wherein the processor is configured to determine a multiplied value by multiplying the compared value with a multiplier.

6. The system of claim 5, wherein the processor is configured to determine a limited value by limiting the multiplied value based on an upper and lower limit range.

7. The system of claim 1, wherein the processor is configured to control the flow of the NO$_X$ minimization fluid within a reduced time period shorter than an emission feedback loop time period.

8. The system of claim 1, wherein the control system is configured to account for changes in power of the gas turbine over a time period of less than 2 minutes.

9. A system, comprising:
a gas turbine configured to generate power from a fuel to drive a load;

an at least one compressor configured to compress an oxidant;
a spray intercooling system configured to spray a spray intercooling fluid to cool the oxidant in the at least one compressor; and
a controller configured to:
  receive a signal indicating demand of the spray intercooling fluid;
  determine a rate of change of the demand of the spray intercooling fluid; control flow of a nitrogen oxide ($NO_X$) minimization fluid that reduces $NO_X$ emissions from the gas turbine based at least in part on the rate of change of the demand of the spray intercooling fluid to account for changes in $NO_X$ emissions due to changes in power of the gas turbine;
  enable the gas turbine to remain in regulatory emissions compliance during a delay in time between a change in the $NO_X$ minimization fluid entering a combustor of the gas turbine and feedback from $NO_X$ emissions generated by the gas turbine; and
  receive feedback from emissions associated with changes in the flow of the $NO_X$ minimization fluid after a first period of time greater than a second period associated with controlling flow of $NO_X$ minimization fluid based on the rate of change of the demand of spray intercooling fluid.

10. The system of claim 9, wherein the controller is configured to determine the rate of change of the demand of the spray intercooling fluid by utilizing a first order lag filter.

11. The system of claim 9, wherein the controller is configured to determine the rate of change of the demand of the spray intercooling fluid derived by comparing the demand of the spray intercooling fluid with a prior demand of the spray intercooling fluid.

12. The system of claim 9, wherein the spray intercooling system sprays the spray intercooling fluid into the compressor via a nozzle based at least in part on the demand of the spray intercooling fluid.

13. A method for controlling a gas turbine, comprising:
receiving, via a processor, a signal indicating demand of a spray intercooling fluid that cools an oxidant in a compressor the gas turbine;
determining, via the processor, a rate of change of the demand of spray intercooling fluid demand;
controlling, via the processor, flow of a nitrogen oxide ($NO_X$) minimization fluid that reduces $NO_X$ emissions from the gas turbine based at least in part on the rate of change of the demand of spray intercooling fluid, wherein flow of the $NO_X$ minimization fluid is controlled based at least in part on feedback from emissions of the gas turbine; and
receiving feedback from emissions associated with changes in the flow of the $NO_x$ minimization fluid after a first period of time greater than a second period associated with controlling flow of $NO_X$ minimization fluid based on the rate of change of the demand of spray intercooling fluid.

14. The method of claim 13, wherein the feedback from emissions and the rate of change of the spray intercooling fluid demand are combined to control the flow of the $NO_X$ minimization fluid.

15. The method of claim 13, wherein determining the rate of change of the demand of spray intercooling fluid comprises utilizing a first order lag filter having a transfer function of $Y(s)/X(s)=Ks/(ts+1)$, wherein $Y(s)$ is the output in the Laplace domain, and $X(s)$ is the input in the Laplace domain, t is a time constant, and K is a gain.

16. The method of claim 13, comprising controlling the flow within a reduced time period shorter than a time period to receive feedback from emissions associated with a change in power of the gas turbine.

17. The method of claim 13, comprising sending one or more signals to a valve to control the flow of the $NO_X$ minimization fluid entering a combustor of the gas turbine.

* * * * *